United States Patent
Brown et al.

(10) Patent No.: US 9,749,199 B2
(45) Date of Patent: *Aug. 29, 2017

(54) DYNAMICALLY DETERMINING PACKET SAMPLING RATES

(71) Applicant: International Business Machines Corporation, Armonk, NY (US)

(72) Inventors: Deanna L. Brown, Queen Creek, AZ (US); Gregory P. Wurth, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,802

(22) Filed: May 10, 2016

(65) Prior Publication Data
US 2016/0254967 A1    Sep. 1, 2016

Related U.S. Application Data

(63) Continuation of application No. 13/743,561, filed on Jan. 17, 2013, now Pat. No. 9,363,151.

(51) Int. Cl.
*H04L 12/26*        (2006.01)

(52) U.S. Cl.
CPC .......... *H04L 43/024* (2013.01); *H04L 43/062* (2013.01); *H04L 43/16* (2013.01); *H04L 43/50* (2013.01); *H04L 43/02* (2013.01)

(58) Field of Classification Search
CPC ..... H04L 43/024; H04L 43/062; H04L 43/02; H04L 43/16
See application file for complete search history.

(56) References Cited

U.S. PATENT DOCUMENTS

| | | |
|---|---|---|
| 6,920,112 B1 | 7/2005 | McCloghrie et al. |
| 7,876,702 B2 | 1/2011 | Imai |
| 8,705,365 B1 | 4/2014 | Martin et al. |
| 2003/0097440 A1 | 5/2003 | Betge-Brezetz et al. |
| 2013/0103914 A1 | 4/2013 | Mitsunbou et al. |

OTHER PUBLICATIONS

Claffy et al., "Application of Sampling Methodologies to Network Traffic Characterization", Computer Communication Review—CCR, vol. 23, No. 4, pp. 194-203, 1993.
Kodialam et al., Detecting Network Intrusions via Sampling: A Game Theoretic Approach, Bell Laboratoreis Lucent Technologies, IEEE, Feb. 2003.
Mori et al., "Identifying Elephant Flows Through Periodically Sampled Packets", AMC. IMC'04, Oct. 25-27, 2004, pp. 115-120.
Phaal et al., "Packet Sampling Basics", Packet Sampling Basics, http://www.sflow.org/packetSamplingBasics/index.htm., pp. 1-6 Sep. 2007.
Duffield et al., "Properties and Prediction of Flow Statistics from Sampled Packet Streams", AT&T Labs-Research, 2002.
"sFlow® Accuracy and Billing", INMON CORP. www.inmon.com, 2004.

(Continued)

*Primary Examiner* — Eric Myers
(74) *Attorney, Agent, or Firm* — Kunzler Law Group

(57) ABSTRACT

For dynamically determining packet sampling rates, a method including setting a packet sampling rate for one or more switch ports, collecting for an interval of time a plurality of statistics for the one or more switch ports, and adjusting the packet sampling rate in response to one or more of the plurality of statistics.

20 Claims, 4 Drawing Sheets

(56) References Cited

OTHER PUBLICATIONS

Brauckhoff et al., "The Effect of Packet Sampling on Anomaly Detection", Department of Information Technology and Electrical Engineering, Swiss Federal Institute of Technology, May 2006.
Jebwad et al., "Traffic estimation for the largest sources on a network, using packet sampling with limited storage", Hewlett Packard Management Mathematics and Security Dept., Mar. 1992.

US 9,749,199 B2

DYNAMICALLY DETERMINING PACKET SAMPLING RATES

CROSS-REFERENCE TO RELATED APPLICATIONS

This application is a continuation of and claims priority to U.S. patent application Ser. No. 13/743,561 entitled "DYNAMICALLY DETERMINING PACKET SAMPLING RATES" and filed on Jan. 17, 2013 for Deanna L. Brown, which is incorporated herein by reference in its entirety.

BACKGROUND

Field

The subject matter disclosed herein relates to network packet sampling and more particularly relates to dynamically determining or updating the rate at which packets are sampled.

Description of the Related Art

Computer networks provide a means for worldwide information transmission sharing. The largest most well-known network is the Internet. Network information is often transmitted from one computing device to another through the network as small pieces of information, referred to as packets. Network packets may vary in size or content, which may be in part based on the type of information being transmitted.

BRIEF SUMMARY

A method for dynamically determining packet sampling rates is disclosed. The method may, in one embodiment, include setting a packet sampling rate for a switch port or a collection of switch ports. The method may, in another embodiment, include collecting for an interval of time a plurality of statistics for the switch port. Also, the method may include adjusting the packet sampling rate in response to one or more of the plurality of statistics.

An apparatus also performs the functions of the method. For example, in one embodiment, an apparatus includes a sampling rate module that sets a packet sampling rate for a switch port. Also, the apparatus may, in one embodiment, include a statistics module that collects for an interval of time a plurality of statistics for the switch port. In addition, the apparatus may include an adjustment module that adjusts the packet sampling rate in response to one or more of the plurality of statistics.

A computer-program product also performs the functions of the method. For example, in one embodiment, the computer-program product includes a computer-readable storage medium having executable code embodied therein, the executable code readable by a processor to set a packet sampling rate for one or more switch ports. In another embodiment, the executable code may also be readable to collect for an interval of time a plurality of statistics for the one or more switch ports. Also, the executable code may be readable to adjust the packet sampling rate in response to one or more of the plurality of statistics.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
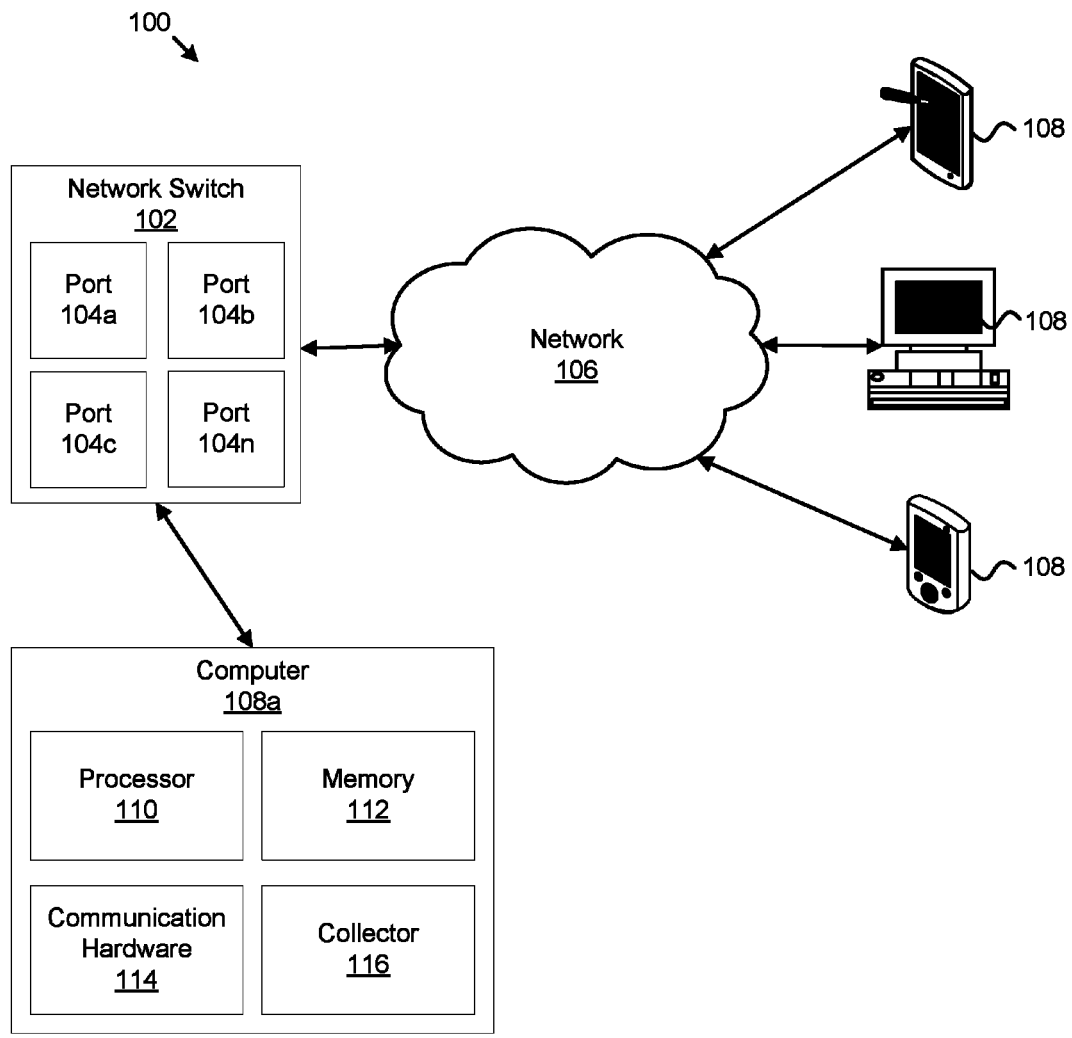
FIG. 1 is a schematic block diagram illustrating one embodiment of a computer device network that dynamically determines packet sampling rates in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 is a schematic block diagram illustrating one embodiment of a system 100 for dynamically determining packet sampling rates. In the depicted embodiment, the system 100 includes a network switch 102, a network 106, and a plurality of electronic devices 108. In one embodiment, the electronic devices 108 may also be embodied as client devices. Although for simplicity one network switch 102, one network 106, and four devices 108 are shown, any number of switches 102, networks 106, and devices 108 may be employed.

The system 100 includes a network switch 102. Network switch 102 may be embodied as hardware such as routers, switches, cabling, and other communication hardware. The network switch 102 may be a part of network 106, or in another embodiment network switch 102 may include its own network. Network switch 102 may include one or more network ports 104. In the depicted embodiment, there are four ports depicted 104a, 104b, 104c, 104n. Another embodiment may include more or fewer network ports 104. Each port 104 may be connected to an electronic device 108, a network device that is part of a network such as network 106, or not connected to anything.

The network switch 102 may be enabled with sampling technology for gathering metrics relating to packets as they flow through a network. One embodiment of sampling technology is the SFLOW standard, which is described at sFlow.org. Information flowing through the network switch 102 may be broken down into packets as it moves from one server to another. Sampling technology uses a collector, described in more detail below, to gather and analyze packets. Examining every packet flowing through a network would be prohibitive due to the resources required, so the collector only analyzes a subset of the packets. To determine which subset to examine, a sampling rate is used. The sampling rate in one embodiment is set to look at every Nth packet.

The network 106 may include a global communications network such as the internet, a Local Area Network ("LAN"), multiple LANs communicating over the internet, a wide area network ("WAN"), or any other similar communications network. The network 106 may include hardware such as routers, switches, cabling, and other communication hardware.

Each device 108 may be embodied as a portable computer, a handheld computing device, a touch device, a personal desktop assistant ("PDA"), a tablet computer, a mobile phone, a smart phone, and the like. A device 108 may also be configured as a mainframe computer, a blade center comprising multiple blades, a desktop computer, a laptop computer, and the like.

An example electronic device 108 may be embodied as computing device 108a. Throughout this disclosure, an exemplary computing device may be referred to interchangeably as computing device "108" or "108a."

Computing device 108a, in one embodiment, may include computer readable storage media, such as memory 112, storing executable code, and may include a processor 110 that executes the executable code as is well known to those skilled in the art. The executable code may be tangibly stored in computer readable storage media in communication with a server. The computing device 108a may include communication hardware 114 such as a modem, an Ethernet card, or another communication hardware for communicating with one or more other electronic devices over a network 106. A server may store data regarding product and/or service documentation, which may be accessed and/or downloaded over the network 106 by the plurality of clients 108. In one embodiment, the computing device 108a may be specifically designed for an embodiment of the invention disclosed herein and may include a collector module 116, which will be described in more detail below with reference to FIG. 2.

Figure 2:
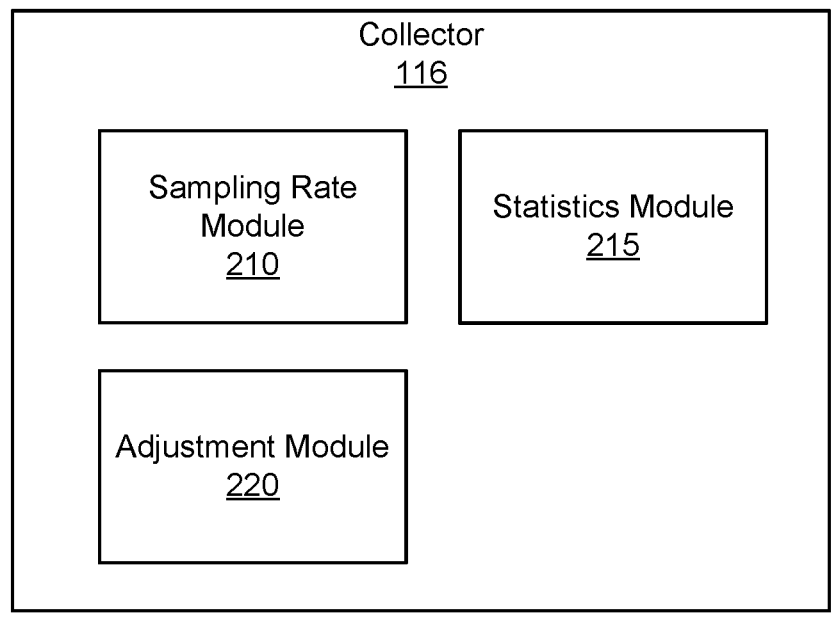
FIG. 2 is a schematic block diagram illustrating one embodiment of a collector module for dynamically determining packet sampling rates in accordance with the present invention.

FIG. 2 illustrates one embodiment of a collector module 116. A collector module 116 may, in one embodiment, include a sampling rate module 210, a statistics module 215, and an adjustment module 220.

The sampling rate module 210 sets a packet sampling rate for a switch port 104. In one embodiment, immediately after the collector 116 is started, the sampling rate module 210 determines the maximum number of samples that can be processed per second. For example, in order to determine the maximum number of samples that can be processed, sampling rate module 210 may perform a large number of test inserts to a sample statistics database, then test how many inserts complete within a given number of seconds. By determining the maximum number of completed inserts, sampling rate module 210 may determine how many typical samples may be inserted into a database or some other data structure per second. The sampling rate module 210 then, in one embodiment, may use the determined number of maximum samples per second to set the initial sampling rate for the collector 116.

The sampling rate module 210 may, in one embodiment, set the initial sampling rate for the collector 116 by using the following formula:

$$sampleRate = \frac{portSpeed * portCount}{8 * avgPacketLength * maxSamplesPerSecond}$$

In the above formula, portSpeed is the maximum number of bits that flow through the port per second, such as 1,000,000,000 for a 1 Gigabit-per-second port, or 10,000,000,000 for a 10 Gigabit-per-second port, etc. The variable portCount is the maximum number of ports that will be configured for sampling. For example, if there are 4 ports that will be sampled, portCount is 4; if 20 ports will be sampled, portCount is 20. The variable avgPacketLength is the average length of each data packet in bytes, such as 1000 bytes. The variable maxSamplesPerSecond is the determined number of maximum samples per second. The 8 in the formula is because avgPacketLength is in bytes, where portSpeed is in bits.

To help illustrate how the formula is used, an example is provided. In one example, the portSpeed might be 1 Gigabit-per-second, with 20 ports to be sampled, an average packet length of 1000, and a determined maximum number of samples per second of 2000. In this example, the sample rate would be set at 1250; that is, sampling every 1250th packet passed through each port.

In another embodiment, a different formula may be used that may include more or different variables, or variables related in a different way. For example, another formula for setting the port sampling rate may include processor usage, memory usage, other resource usage, network traffic, or another variable as a part of determining the sampling rate.

The statistics module 215 collects for an interval of time one or more statistics for the switch port. As or after the collector 116 collects samples at the rate set by the sampling rate module 210, the statistics module 215 gathers or calculates statistics on the collected samples.

One statistic gathered by the statistics module 215 may include the average packet length. This may be, in one embodiment, the average length of each data packet in bytes.

Another statistic may include the average port speed. A port may be rated at a certain speed, such as 1 Gigabit-per-second, but may not actually operate at that speed. The statistics module determines the speed that the port is actually operating at as the average port speed. As network traffic varies, the amount of data being sent through a port may be less than the maximum port speed. For example, there may be a burst of data for a few minutes, followed by a time period where the port is idle or very few packets are passed through. Such a situation may result in an average port speed that is less than the maximum port speed possible for the port. In another example, the port might have a problem that prevents it from operating at its rated speed, or there may be insufficient network traffic. In another embodiment, the port, while capable of operating at a faster rate, may have been set by the user or automatically by the switch or other network device to operate at a slower rate. For example, a port capable of operating at 1 Gbps may be set to be limited to 512 bits per second. Note that in one example embodiment, in the formula for setting the sampling rate described above in connection with the sampling rate module 210, the portSpeed variable may be replaced by the average port speed.

Another statistic may include the actual samples received per second. The actual samples received per second may indicate the number of samples received by the collector per second. In another embodiment, the variable may indicate the number of samples processed or analyzed by a collector per second. For example, in one embodiment, the sampling rate may be set higher than the collector 116 is capable of processing, leading to the attempted sampling rate differing from the actual sampling rate.

Another statistic may include the port count. The number of ports may vary during or between sampling periods. As the port count may be, in one embodiment, a statistic gathered by the statistics module 215. For example, the collector 116 may initially sample 10 ports, but then later sample 1000 ports.

Another statistic may include maximum port utilization. Maximum port utilization may, in one embodiment, be the maximum port speed that a port reaches during a certain period of use. For example, theoretically a 1 gigabit-per-second port may reach a maximum port utilization of 1 gbps, but may, in one instance of actual use, only actually achieve 0.9 gbps. Thus, maximum port utilization, in one case, may be helpful to know to ensure that a sample rate is not set that would result in too many samples being received during peak usage. In another embodiment, the maximum port utilization may replace the portSpeed variable in the formula described above in connection with the sampling rate module 210.

The above described statistics are only exemplary, and in any embodiment the statistics module 215 may gather one or more, or all, of the described statistics. In another embodiment, the statistics module 215 may gather statistics in addition to or other than the ones described.

The adjustment module 220 adjusts the packet sampling rate. This could be for many different reasons. For example, there are several factors that go into determining what the sampling rate is. The lower the sampling rate is set, the more packets collected. If the sampling rate is set too low, for example, the collector or network could be overloaded by the collection of too many packets. This is because in one example, the collector may only be able to process a certain number of samples per second. By collecting an increased number of samples, the processor utilization could increase as well. In another example, collecting more samples results in an increased memory usage.

In another example, if the sampling rate is set too high, then there are not enough samples being collected, resulting in a low percentage of packets being sampled. If the percentage of packets being sampled is too low, in one example, the error rate may increase because there are not enough samples being examined. For example, if only 0.0001% of the packets are being collected as samples, then the error rate may be higher than desirable. A too-low percentage may also result in an inaccurate picture of the packets flowing through the network.

The adjustment module 220 in one embodiment relieves the problems of too-high or too-low sampling rates by dynamically adjusting the sampling rate of the collector 116. By dynamically adjusting the sampling rate, the collector 116 resource utilization may be maintained at a desirable level—one that utilizes available resources without overloading the processor or memory usage. In one embodiment, the adjustment module 220 attempts to maintain the highest percentage of samples possible based on the hardware constraints. In another embodiment, the adjustment module 220 attempts to maintain the maximum possible sampling rate, and have the rate be constant for all the ports being sampled, without overloading the hardware resources of the computing device 108 that the collector 116 is running on. In one example, the adjustment module 220 determines the maximum hardware restraints, such as processor, memory, or storage capability of the computing device 108, and uses that maximum rate to set the sampling rate so that the collector 116 is always gathering the maximum percentage of samples.

In one example, the maximum percentage of samples based on hardware capabilities varies based on other factors. For example, the maximum sampling percentage rate based on the hardware capabilities of the computing device 108 may be 10% for a period of time. At a point in time, another program on the computing device may start processing or otherwise begin consuming computing resources such as processor or memory resources, resulting in fewer resources available for the collector 116 to utilize. The adjustment module 220 may then adjust the sampling rate to a different sampling rate that results in sampling a lower percentage of samples, such as 1%, for a time period, or until the other program releases or stops utilizing the resources. When additional resources are again available, the adjustment module 220 may adjust the sampling rate to result in sampling a higher percentage of samples, such as the original sampling percentage rate of 10%. In another embodiment, the adjusted sampling rate may be higher or lower than the original sampling rate; the sampling percentage rate may always be the maximum possible sampling rate possible based on the available hardware resources, or the capabilities of the computing device 108 that the collector 116 is running on. In one embodiment, the adjustment module 220 may adjust the sampling rate at a fixed time period, for example adjusting the sampling rate every N seconds. In another embodiment, the adjustment module 220 might monitor resource usage, and adjust the sampling rate if resource capabilities adjust by more than a certain threshold amount. In a further embodiment, the adjustment module 220 might adjust the sampling rate every N number of samples.

In another example, the adjustment module 220 may adjust the sampling rate if the hardware changes because the collector 116 changes from one computing device 108 to a different computing device 108N. For example, if computing device 108 fails, and as part of a fail-over system the collector 116 begins operating on a different computing device 108N, which may have different hardware or other capabilities than computing device 108, the adjustment module 220 adjust the sampling rate of the collector 116 based on the different hardware capabilities of computing device 108N. Alternatively, in a fail-over system the collector 116 on failed computing device 108 may stop collecting data, and a different collector on backup computing device 108N may begin collecting data, recalculating the sampling rate based on the capabilities of device 108N.

In another embodiment, the adjustment module 220 may attempt to maintain a constant sampling percentage rate; that is, sampling a constant percentage of the packets flowing through the network. For example, if the desired percentage rate is 1%—that is, looking at 1% of the packets flowing through the port—the adjustment module 220 would dynamically adjust the sampling rate to keep that sampling percentage rate. For example, over time the number of packets flowing through the port might adjust up or down, or the type of packets might change, or the size of the packets might increase or decrease. In other words, the factors that determine the sample rate or the sample rate percentage may change, resulting in a different achieved sampling percentage rate. The adjustment module 220, in one embodiment, adjusts the sample rate to maintain a desired sampling percentage rate. In one embodiment, the adjustment module 220 uses a formula similar to the one described in connection with the sampling rate module 210 to determine the adjusted sampling rate. In another embodiment, the adjustment module 220 may use one or more of the statistics gathered by the statistics module 215 to determine how to adjust the sampling rate.

In a further embodiment, the adjustment module 220 may adjust the packet sampling rate in response to the statistics module detecting a maximum sample per second rate for a first statistic gathering period varying more than a threshold amount from a maximum sample per second number for a second statistic gathering period. For example, if a statistic gathering period is N seconds, if a certain statistic varies between the first gathering period and the second gathering period, then the adjustment module 220 adjusts the packet sampling rate.

The adjustment module 220 may use one or more statistics gathered by the statistics module 215 to adjust the sampling rate. Some exemplary, but non-limiting, statistics that the adjustment module 220 could use to calculate or adjust the sampling rate may include average packet length, average port speed, maximum port utilization, port count, actual samples received per second, and the like.

In another example, the adjustment module 220 may adjust the sampling rate automatically in response to a sample queue becoming greater than a threshold. For example, the collector 116 may have a queue for processing received samples. If the queue becomes longer than a certain threshold, which could happen, for example, because the sampling rate is collecting more samples than the collector 116 can handle based on the processing capability of the computing device 108, then the adjustment module 220 may automatically adjust the sampling rate so that the queue does not continue to grow. For example, the adjustment module 220 may adjust the sample rate to decrease the number of samples received until the queue is mostly or completely processed, then adjust the sample rate again so that the number of samples is maximized based on one or more statistics or the processing capabilities of the computing device 108.

The packet sampling rate may vary between different ports. In one example, the adjustment module 220 may adjust the packet sampling rate in response to a sample rate percentage for a first port varying more than a threshold amount from a sample rate percentage for a second port.

Figure 3:
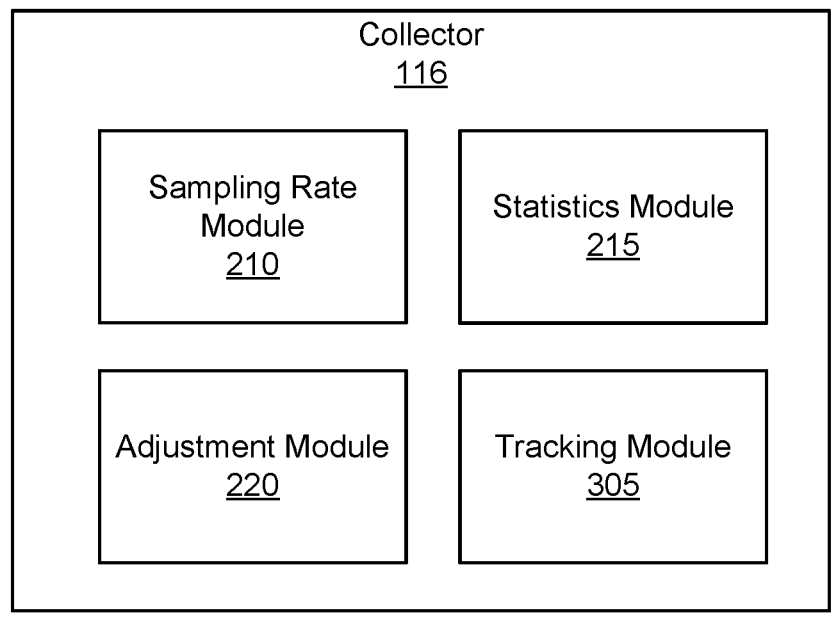
FIG. 3 is a schematic block diagram illustrating another embodiment of a collector module for dynamically determining packet sampling rates in accordance with the present invention.

FIG. 3 illustrates another embodiment of a collector module 116. The collector module 116 may be similar to the collector module 116 described in association with FIGS. 1 and 2. Collector module 116 may include a sampling rate module 210, a statistics module 215, and an adjustment module 220. Each of the sampling rate module 210, the statistics module 215, and the adjustment rate module 220 may, in one embodiment, be substantially similar to the corresponding modules described in accordance with FIG. 2.

In one embodiment, collector 116 may include a tracking module 305. The tracking module 305 may, in one embodiment, track various statistics other than those gathered by the statistics module 215. In another embodiment, the tracking module 305 may utilize statistics gathered by the statistics module 215 to determine other pieces of information, which may be related to the packets sampled by the collector 116. One piece of information that may be tracked by the tracking module 305 may include actual port utilization over time. For example, one port on the network may receive a lot of traffic, always being utilized at full capacity. A different port on the network may only occasionally be used, and rarely used at full capacity. In another example, a port may have hardware or other problems, resulting in its only operating at partial capacity. In a further example, a port may be set to only operate at a certain capacity or speed, rather than its full capacity. The tracking module 305 may track the actual port utilization of each port to determine actual usage of each port.

In another embodiment, the tracking module 305 may track the average packet length over time. For example, the average packet length of the samples recently gathered may be different than the average packet length used to set the sampling rate.

In a further embodiment, if the samples are added to a processing queue for the collector to process received samples, the tracking module 305 may track the sample wait time. The sample wait time may represent the amount of time between when a sample is received and when it is completely processed. Alternatively, the sample wait time may be the amount of time between when a sample is sent and when it is completely processed.

The adjustment module 220 may adjust the sampling rate based on information gathered by the tracking module 305. In one embodiment, the adjustment module 220 may combine statistics gathered by the statistics module 215 with information gathered by the tracking module 305.

For example, if the actual port utilization over time is different than the port utilization used to set the sampling rate, then the adjustment module 220 may adjust the sampling rate based on the actual port utilization over time.

In another example, if the average packet length over time is different than the packet length used to set the sampling rate, then the adjustment module 220 may adjust the sampling rate based on the average packet length over time. The time over which the average packet length is considered could vary, for example examining the packets gathered in the most recent N seconds, the most recent N minutes, the most recent N hours, the most recent N days, or the like. For example, if the average packet length of the samples recently gathered is different than the average packet length used to set the sampling rate, then the adjustment module 220 may adjust the sampling rate based on the updated average packet length over time.

In a further example, the adjustment module 220 may adjust the sampling rate based on a packet sample wait time. The packet sample wait time could, in one embodiment, be an average of a number of packet sample wait times. In another embodiment, the packet sample wait time could be the most recent packet sample wait time, or the packet sample wait time could itself be sampled to represent the packet sample wait time for packet sample N.

Figure 4:
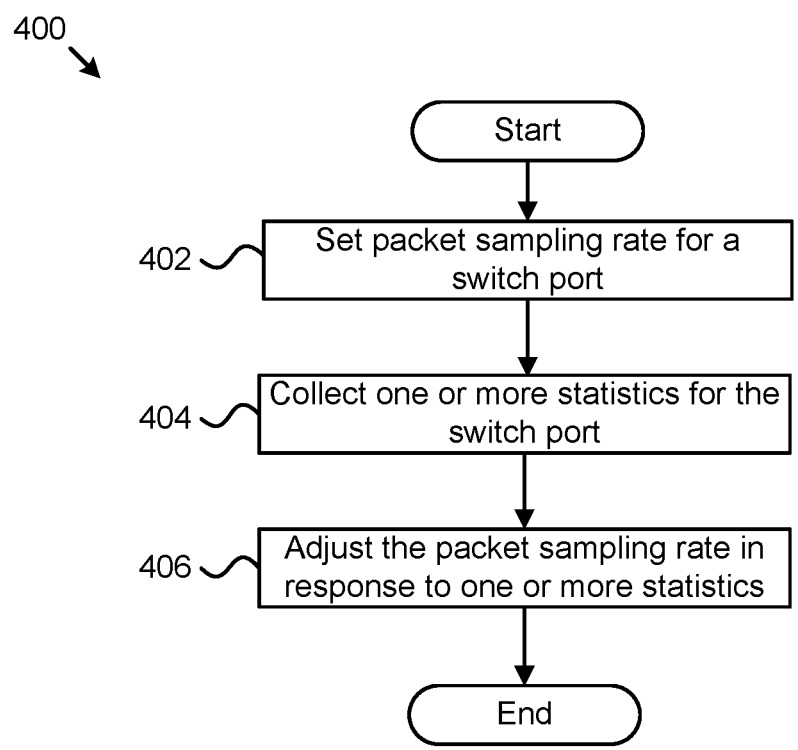
FIG. 4 is a schematic flow chart diagram illustrating one embodiment of a method for dynamically determining packet sampling rates in accordance with the present invention.

FIG. 4 illustrates a method for dynamically determining packet sampling rates. The method may, in one embodiment, operate substantially similarly to the way that packet sampling rates are determined in connection with FIGS. 1-3.

In step 402, a collector sets the packet sampling rate for a switch port. The initial packet sampling rate could be set using a formula that, in one embodiment, is substantially similar as a formula described in connection with the sampling rate module 210 of FIG. 2. In a further embodiment, the variables used for a formula used to set the sampling rate could include one or more of average packet length, port speed, maximum port utilization, port count, or samples received per second. In one embodiment, the packet sampling rate may be set using estimates of one or more variables, while in another embodiment collected packet samples may be used to determine the values to use for one or more variables. For example, port speed could be estimated port speed, rated port speed, or average port speed.

In one example embodiment, a maximum number of samples that can be processed per second may be determined. Then an initial packet sampling rate for a switch port may be set, with the initial packet sampling rate calculated using the maximum number of samples that can be processed per second as a factor.

In step 404, a collector sets collect one or more statistics for the switch port. In one embodiment, the statistics may be collected similarly to the statistics collection as described in connection with the statistics module 215 of FIG. 2.

The collected statistics in one embodiment could include one or more of average packet length, average port speed, maximum port utilization, port count, or actual samples received per second.

In step 406, a collector adjusts the packet sampling rate in response to one or more statistics. In one embodiment, the sampling rate is adjusted substantially similar to the sampling rate adjustment described above in connection with the adjustment module 220 of FIG. 2.

In one example, the sampling rate may be adjusted in response to one or more of the statistics gathered in step 404. In another embodiment, the sampling rate may be adjusted automatically in response to a sample queue becoming greater than a threshold. In a further embodiment, the sampling rate may be adjusted in response to a sample rate percentage for a first port varying more than a threshold amount from a sample rate percentage for a second port.

In an additional embodiment, the sampling rate may be adjusted in response to a maximum sample per second rate for a first statistic gathering period varying more than a threshold amount from a second maximum sample per second rate for a second statistic gathering period.

In another embodiment, a sample wait time may be measured with other statistics in step 404. Then, in step 406, the packet sampling rate may be adjusted in response to the measured sample wait time. In a further embodiment, an early adjustment of the packet sampling rate may be triggered in response to a sample wait time outside of a range.

Figure 5:
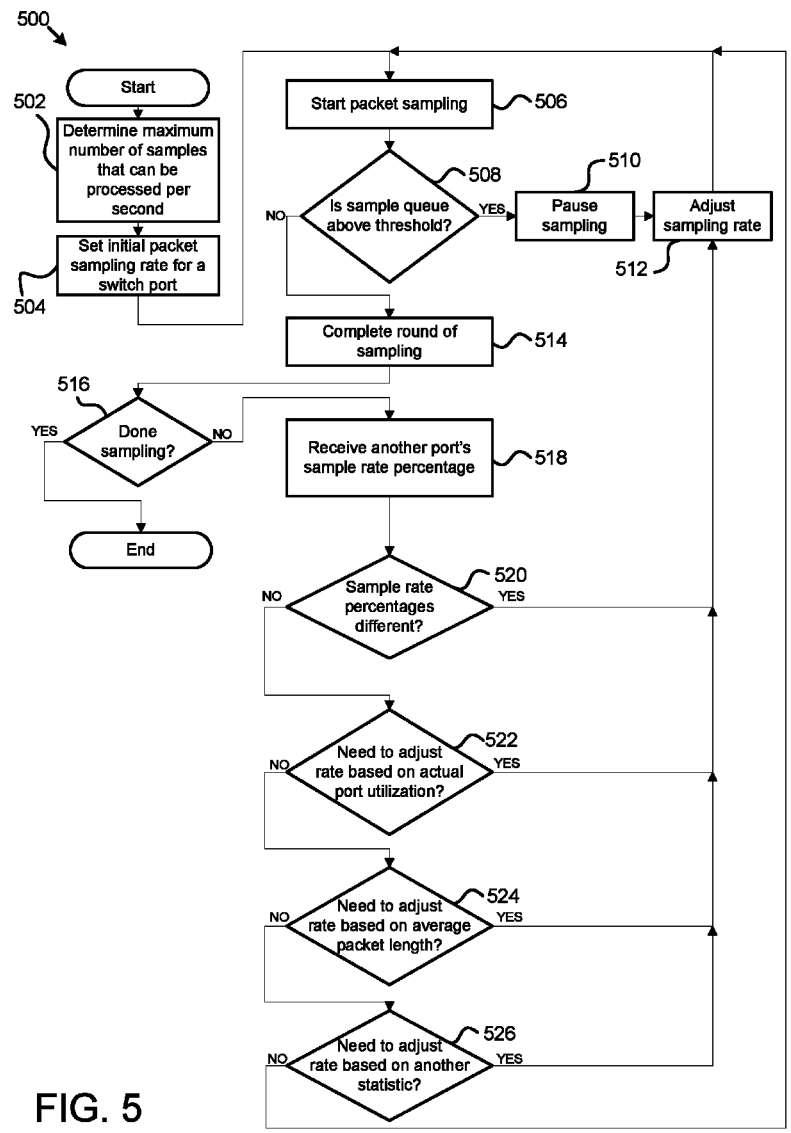
FIG. 5 is a schematic flow chart diagram illustrating another embodiment of a method for dynamically determining packet sampling rates in accordance with the present invention.

FIG. 5 illustrates another method for dynamically determining packet sampling rates. In the illustrated method, setting the packet sampling rate for a single switch port is described, but the method may be used for setting packet sampling rates for one or more switch ports, or one or more collections of switch ports.

In step 502, a collector determines the maximum number of samples that can be processed per second by a computing device, such as a server, that the collector is running on. The maximum number of samples may be affected by the hardware resources of the computing device, such as the processor or memory. The maximum number of samples may also be affected by other programs running on or tasks being performed by the computing device.

In step 504, the collector sets the initial packet sampling rate for one or more switch ports. Each switch port, in the case of multiple switch ports, may in one embodiment have a different sampling rate. In one example, the initial packet sampling rate may be set using the maximum number of samples that can be processed per second by the computing device. In another example, a default sampling rate may be set, independent of the processing capabilities of the computing device. In a further embodiment, the initial sampling rate might be random.

In step 506, packet sampling begins.

In step 508, the collector determines whether the sample processing queue is greater than a threshold. If the sample processing queue is greater than a threshold, in step 510, sampling is paused, and in step 512 the sampling rate is adjusted. Sampling then resumes at step 506 with the adjusted sampling rate. If in step 508 the sample queue is not greater than the threshold, sampling continues until in step 514 the round of sampling is completed. A round of sampling could be determined, for example, by a certain period of time, such as N minutes or N hours. In another example, a certain time every day is set to be the completion time for a round of sampling, such as at noon every day. In a further example, a round of sampling could be determined by the number of samples, for example every 10,000 samples.

In step 516, the collector determines whether sampling is to continue. For example, if a user, a different computing device, or something else triggered an end of sampling, the sampling may end. If the collector determines in step 516 that sampling is not to continue, the method ends.

If the collector determines that sampling is to continue, the collector in step 518 receives a port sample rate percentage. In step 520, the collector determines whether the port sample rate percentage received in step 518 varies more than a given threshold from another port's sample rate percentage. If the sample rate percentages between the two ports varies more than the given threshold, the collector may, in step 512, adjust the packet sampling rate. Otherwise, the method may continue.

In step 522 the collector determines whether the sampling rate needs to be adjusted based on actual port utilization. For example, if actual port utilization over time is different than the port utilization used to set the packet sampling rate, then the collector may, in step 512, adjust the packet sampling rate using the actual port utilization over time. Otherwise, the method may continue.

In step 524, the collector determines whether the sampling rate needs to be adjusted based on average packet length. For example, if average packet length over time is different than the packet length used to set the packet sampling rate, then the collector may, in step 512, adjust the packet sampling rate using the average packet length over time. Otherwise, the method may continue.

In step 526, the collector determines whether the sampling rate needs to be adjusted based on another statistic. For example, the collector may adjust the packet sampling rate based on one or more of average packet length, average port speed, maximum port utilization, port count, actual samples received per second, or another variable or statistic.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    setting a packet sampling rate for a first port of a plurality of switch ports;
    collecting for an interval of time a plurality of statistics for the plurality of switch ports; and
    adjusting the packet sampling rate in response to one or more of the plurality of statistics, wherein the packet sampling rate is adjusted in response to a sample rate percentage for the first port varying more than a threshold amount from a sample rate percentage for a second port.

2. The method of claim 1, further comprising tracking the average packet length over time.

3. The method of claim 1, further comprising adjusting the packet sampling rate in response to a maximum sample per second rate for a first statistic gathering period varying more than a threshold amount from a maximum sample per second rate for a second statistic gathering period.

4. The method of claim 1, further comprising:
    measuring a sample wait time; and
    adjusting the packet sampling rate in response to the sample wait time.

5. The method of claim 4, further comprising triggering an early adjustment of the packet sampling rate in response to a sample wait time outside of a range.

6. The method of claim 1, further comprising:
    determining a maximum number of samples that can be processed per second; and
    setting an initial packet sampling rate for a plurality of switch ports, wherein the initial packet sampling rate is calculated using the maximum number of samples that can be processed per second as a factor.

7. An apparatus comprising:
    a sampling rate module that sets a packet sampling rate for a first port of a plurality of switch ports;
    a statistics module that collects for an interval of time a plurality of statistics for the plurality of switch ports; and
    an adjustment module that adjusts the packet sampling rate in response to one or more of the plurality of the statistics, wherein the packet sampling rate is adjusted in response to a sample rate percentage for the first port varying more than a threshold amount from a sample rate percentage for a second port.

8. The apparatus of claim 7, further comprising a tracking module that tracks the average packet length over time.

9. The apparatus of claim 7, wherein the plurality of statistics includes one or more of average packet length, average port speed, maximum port utilization, port count, and actual samples received per second.

10. The apparatus of claim 7, further comprising a tracking module that measures a sample wait time, and the adjustment module adjusts the packet sampling rate in response to the sample wait time.

11. The apparatus of claim 10, wherein the adjustment module triggers an early adjustment of the packet sampling rate in response to a sample wait time outside of a range.

12. The apparatus of claim 7, wherein the adjustment module adjusts the packet sampling rate in response to the statistics module detecting a maximum sample per second rate for a first statistic gathering period varying more than a threshold amount from a maximum sample per second rate for a second statistic gathering period.

13. The apparatus of claim 7, wherein the adjustment module determines a maximum number of samples that can be processed per second, and the sampling rate module sets an initial packet sampling rate for a plurality of switch ports, wherein the initial packet sampling rate is calculated using the maximum number of samples that can be processed per second as a factor.

14. A computer-program product, the computer program product comprising a computer-readable storage medium having executable code embodied therein, the executable code readable by a processor to:
    set a packet sampling rate for a first port of a plurality of switch ports;
    collect for an interval of time a plurality of statistics for the plurality of switch ports; and
    adjust the packet sampling rate in response to one or more of the plurality of statistics, wherein the packet sampling rate is adjusted in response to a sample rate percentage for the first port varying more than a threshold amount from a sample rate percentage for a second port.

15. The computer-program product of claim 14, further comprising executable code readable by the processor to track the average packet length over time.

16. The computer-program product of claim 14, wherein the plurality of statistics includes one or more of average packet length, average port speed, maximum port utilization, port count, and actual samples received per second.

17. The computer-program product of claim 14, further comprising executable code readable by the processor to:
   measure a sample wait time; and
   adjust the packet sampling rate in response to the sample wait time.

18. The computer-program product of claim 17, further comprising executable code readable by the processor to trigger an early adjustment of the packet sampling rate in response to a sample wait time outside of a range.

19. The computer-program product of claim 14, further comprising executable code readable by the processor to adjust the packet sampling rate in response to a maximum sample per second rate for a first statistic gathering period varying more than a threshold amount from a maximum sample per second rate for a second statistic gathering period.

20. The computer-program product of claim 14, further comprising executable code readable by the processor to:
   determine a maximum number of samples that can be processed per second; and
   set an initial packet sampling rate for a plurality of switch ports, wherein the initial packet sampling rate is calculated using the maximum number of samples that can be processed per second as a factor.

\* \* \* \* \*